United States Patent
Lippold-Fritz et al.

(10) Patent No.: US 9,902,336 B2
(45) Date of Patent: Feb. 27, 2018

(54) HOLDING DEVICE FOR A PORTABLE ELECTRONIC DEVICE IN A MOTOR VEHICLE

(71) Applicant: Daimler AG, Stuttgart (DE)

(72) Inventors: Oliver Lippold-Fritz, Ostfildern (DE); Ulf Kuehnapfel, Stuttgart (DE); Adrian Rivinius, Stuttgart (DE); Markus Kerner, Hambruecken (DE)

(73) Assignee: Daimier AG, Stuttgart (DE)

( * ) Notice: Subject to any disclaimer, the term of this patent is extended or adjusted under 35 U.S.C. 154(b) by 0 days.

(21) Appl. No.: 15/024,805

(22) PCT Filed: Sep. 26, 2014

(86) PCT No.: PCT/EP2014/002614
§ 371 (c)(1),
(2) Date: Mar. 24, 2016

(87) PCT Pub. No.: WO2015/043753
PCT Pub. Date: Apr. 2, 2015

(65) Prior Publication Data
US 2016/0229353 A1    Aug. 11, 2016

(30) Foreign Application Priority Data
Sep. 28, 2013   (DE) .......................... 10 2013 016 214

(51) Int. Cl.
*B60R 9/00* (2006.01)
*B60R 11/02* (2006.01)
*B60R 11/00* (2006.01)

(52) U.S. Cl.
CPC .......... *B60R 11/02* (2013.01); *B60R 11/0235* (2013.01); *B60R 11/0252* (2013.01); *B60R 2011/008* (2013.01); *B60R 2011/0075* (2013.01)

(58) Field of Classification Search
CPC .................................................... B60R 11/0241
(Continued)

(56) References Cited

U.S. PATENT DOCUMENTS 4,485,946 A * 12/1984 Liautaud .................. A45F 5/02
224/196
5,033,709 A *  7/1991 Yuen .................... B60R 11/0241
224/558
(Continued)

FOREIGN PATENT DOCUMENTS

DE    10 2005 033 479 A1    8/2006
DE    20 2006 004 144 U1    11/2006
(Continued)

OTHER PUBLICATIONS

PCT/EP2014/002614, International Search Report (PCT/ISA/220 and PCT/ISA/210) dated Jan. 21, 2015, with partial English translation, enclosing Written Opinion of the International Searching Authority (PCT/ISA/237) (Thirteen (13) pages).
(Continued)

*Primary Examiner* — Adam Waggenspack
*Assistant Examiner* — Lester L Vanterpool
(74) *Attorney, Agent, or Firm* — Crowell & Moring LLP

(57) ABSTRACT

A holding device for a portable electronic device in a motor vehicle is disclosed. The holding device has a base part for mounting the portable electronic device and a securing element by which the portable electronic device can be secured on the base part. The base part has a guiding device having respective lateral guiding elements by which the portable electronic device can be inserted into the holding device.

5 Claims, 3 Drawing Sheets

(58) Field of Classification Search
USPC ............... 224/567, 552; 248/346.06, 346.07
See application file for complete search history.

(56) References Cited

U.S. PATENT DOCUMENTS

| | | | | |
|---|---|---|---|---|
| 5,149,032 | A * | 9/1992 | Jones | A47G 23/0225 248/154 |
| 5,179,590 | A * | 1/1993 | Wang | B60R 11/0241 224/482 |
| 5,187,744 | A * | 2/1993 | Richter | B60R 11/0241 224/553 |
| 5,627,727 | A * | 5/1997 | Aguilera | G06F 1/1626 361/679.43 |
| 6,002,921 | A * | 12/1999 | Pfahlert | B60R 11/0241 455/420 |
| 6,062,518 | A * | 5/2000 | Etue | B60R 11/0241 224/542 |
| 6,438,229 | B1 * | 8/2002 | Overy | H02J 7/0044 379/446 |
| 6,848,662 | B2 * | 2/2005 | Paramonoff | E05C 3/14 248/222.11 |
| 9,162,630 | B2 * | 10/2015 | Pluta | B60R 11/02 |
| 2007/0262223 | A1 * | 11/2007 | Wang | B60R 11/0241 248/346.07 |
| 2007/0284500 | A1 * | 12/2007 | Fan | B60R 11/02 248/346.06 |
| 2008/0203260 | A1 * | 8/2008 | Carnevali | B60R 11/0241 248/316.5 |
| 2010/0295228 | A1 * | 11/2010 | Woody | B60R 11/0241 269/254 R |
| 2012/0206875 | A1 | 8/2012 | Carnevali | |
| 2013/0146632 | A1 * | 6/2013 | Lai | B60R 11/0241 224/572 |

FOREIGN PATENT DOCUMENTS

| | | |
|---|---|---|
| DE | 20 2007 015 959 U1 | 3/2008 |
| DE | 20 2011 106 185 U1 | 2/2012 |
| DE | 10 2012 009 658 A1 | 11/2012 |
| FR | 2 964 070 A1 | 3/2012 |
| JP | 10-224445 A | 8/1998 |
| JP | 2007-288593 A | 11/2007 |
| WO | WO 2005/118344 A1 | 12/2005 |

OTHER PUBLICATIONS

German-language Office Action issued in German counterpart application No. 10 2013 016 214.9 dated Sep. 24, 2014 (Six (6) pages).
Japanese Office Action issued in Japanese counterpart application No. 2016-518099 dated Jul. 4, 2017, with partial English translation (Nine (9) pages).

* cited by examiner

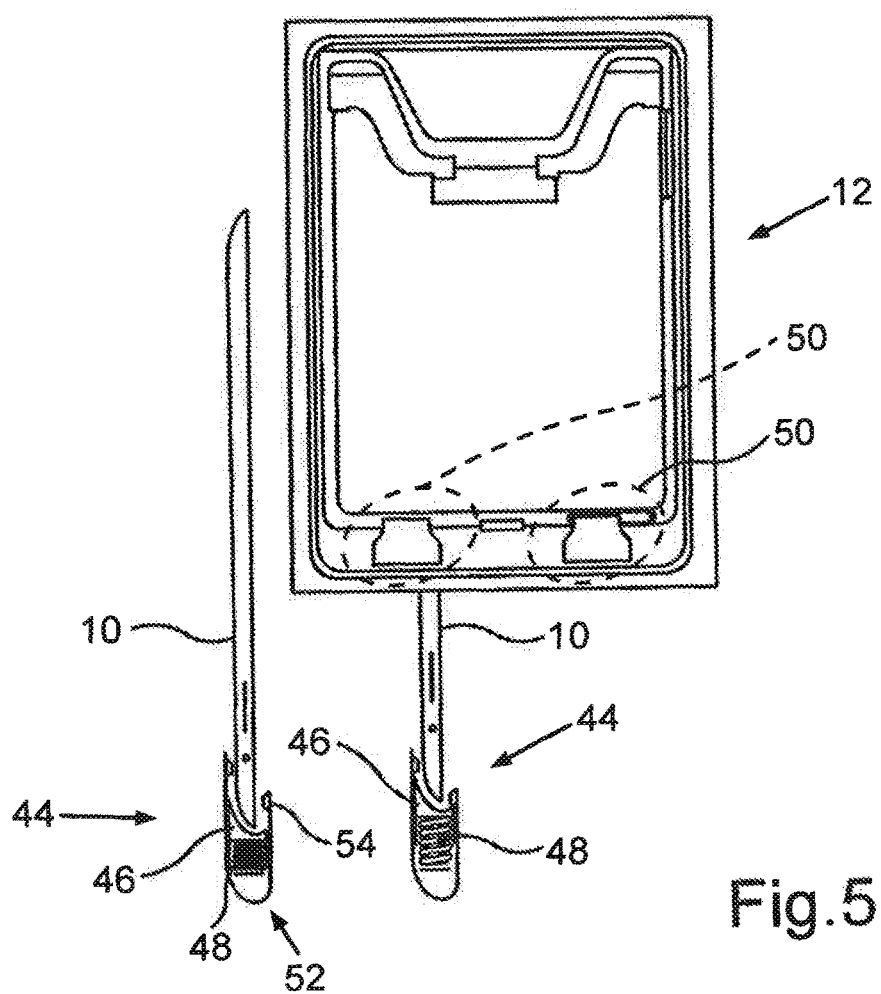
Fig.5
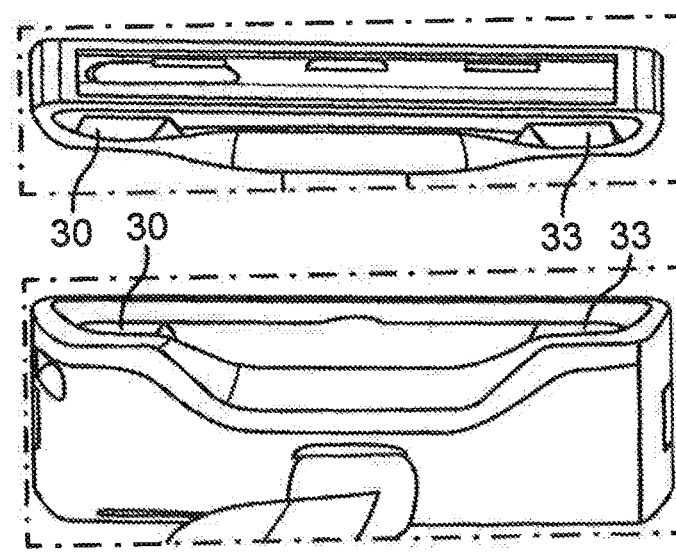
Fig.6a
Fig.6b

HOLDING DEVICE FOR A PORTABLE ELECTRONIC DEVICE IN A MOTOR VEHICLE

BACKGROUND AND SUMMARY OF THE INVENTION

The invention relates to a holding device for a portable electronic device in a motor vehicle.

Such a holding device can, for example, already be gleaned as known from DE 10 2012 009 658 A1 and serves for the mounting of a portable electronic device in the form of a so-called smartphone or a so-called tablet computer. Here, the holding device comprises a base part having a mounting rail with an at least substantially L-shaped cross section, on which mounting rail the electronic device is positioned with a lower end face. The electronic device is secured on the upper end face, which is opposite the lower end face, by means of a bow-shaped securing element which can be adjusted in the vertical direction of the electronic device relative to the base part.

A further holding device of this type also be gleaned as known from DE 20 2011 106 185 U1 in which a base part is also provided which has a box-like mounting on its lower end for the loose holding of the electronic device. A bow-like securing element is furthermore provided on its upper side of the holding device facing away from the box-like mounting of the base part, the securing element being able to be shifted between a release position and a securing position, in which the electronic device is held on the base part.

A common feature of both holding devices is that they only enable a limited holding or fixing of the respective electronic device. In particular, there has been no reliable lateral holding of the respective electronic device in either of the holding devices.

The object of the present invention is therefore to create a holding device of the type described above, which ensures a more reliable holding of the respective electronic device.

In order to create a holding device, by means of which an improved holding of the electronic device can be achieved, it is provided according to the invention that the base part has a guiding device having respective lateral guiding elements, by means of which the electronic device is able to be inserted into the holding device. Contrary to previous prior a a base part is therefore provided according to the invention which enables an exact insertability of the respective electronic device into the base part by means of the respective lateral guiding elements and on the other hand ensures a reliable holding in its inserted position or in the inserted state by means of the respective guiding elements. By means of the lateral guiding elements, both a more simply operated fastening process on the base part itself can be achieved and a far more favorable fixing of the electronic device on the base part is enabled after the insertion.

On the other hand, the prior art according to DE 20 2011 106 185 U1 in particular already shows a box-shaped mounting on the lower end of the base part, which, however, does not enable lateral guiding of the respective electronic device and in particular does also not ensure sufficient securing on the base part perpendicular to the respective operating surface of the respective electronic device.

Overall, it is thus recognizable that a corresponding electronic device is able to be inserted and fixed manually and in a simple manner by the present invention. In particular in the case of driving motor vehicles, it is thereby ensured in an extremely reliable manner that the electronic device is not able to move relative to the holding device.

In a further embodiment of the invention, it is provided that the electronic device is fixed in the inserted position by means of the respective lateral guiding elements. In other words, the lateral guiding elements should therefore enable not only a reproducible and simple fastening process of the electronic device on the holding device, but also a reliable fixing in the inserted position.

It is furthermore advantageous that the securing element can be shifted between a release position and a securing position, in which the securing element fixes the electronic device by means of its self-locking mounting. The securing element is therefore designed according to the invention in such a way that it secures the electronic device in a fixed position in the securing position without a spring element or similar having to apply a corresponding spring force here which counteracts the extraction movement of the electronic device out of the guiding elements.

A further preferred embodiment provides that the securing element is formed as a rocker having a handle arranged on one side of a bearing axis and having at least one fixing element arranged on the other side of the bearing axis. Such a rocker can be handled by an operator extremely easily and intuitively and additionally enables a particularly favorable securing of the electronic device within the base part.

A further preferred embodiment provides that the securing element has at least one slide ramp, by means of which the securing element can be shifted into the release position during insertion of the electronic device into the holding device. In other words, the at least one slide ramp makes it is possible for the securing element to automatically move into the release position without the securing element having to be actuated separately by means of the handle. This results in a particularly simple fixing or insertion movement of the electronic device into the holding device.

In an advantageous embodiment of the invention, a spring support is allocated to the guiding device, against the spring force of which the electronic device can be inserted into the holding device or by means of the spring force of which the electronic device can be pushed out of or ejected from the holding device after the securing element has been released. This results, in particular by ejection of the electronic device, in a particularly simple removal of the electronic device from the base part.

A further advantageous embodiment provides that the securing element is formed as an at least substantially U-shaped bow which surrounds an opening in a rear panel of the base part. Overall, an arrangement thus results in which the U-shaped bow can be actuated in a simple manner by means of a hand and the electronic device can be removed at the same time.

In this context, it has finally been shown to be advantageous if the base part has a circumferential frame, having a frame element, on its front facing away from the rear panel having the securing element, the frame element bridging the opening in the rear panel of the base part. In the inserted state of the electronic device, particularly favorable handling results by means of this additional frame element which is located on the upper side of the electronic device.

Further advantages, features and details of the invention arise from the following description of a preferred exemplary embodiment as well as with the aid of the drawings.

BRIEF DESCRIPTION OF THE DRAWINGS

FIG. 5 is a top view as well as two sectional views of the base part of the holding device, the guiding device of which having a spring support, against the spring force of which the electronic device can be inserted into the holding device or by means of the spring force of which the electronic device can be pushed out of the holding device after the securing element has been released; and FIGS. 6a, 6b are a perspective top view and a perspective view obliquely from above of the holding device according to FIGS. 1a to 5 in the region of the securing element.

DETAILED DESCRIPTION OF THE DRAWINGS

Figure 1A:
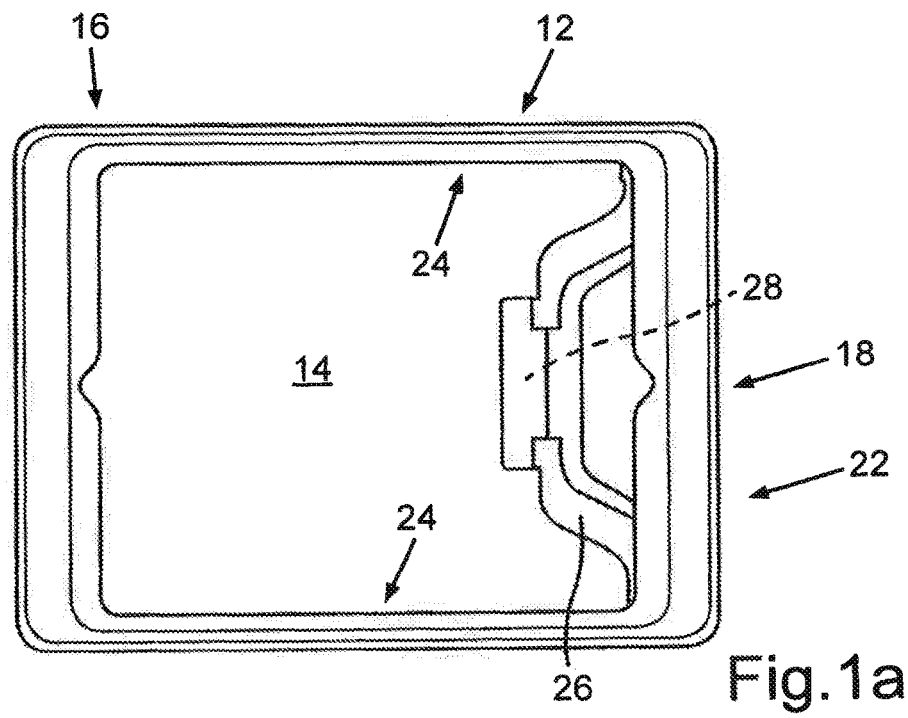
FIGS. 1a, 1b are a front view and a perspective rear view of a holding device for a portable electronic device in the form of a tablet computer, having a base part for mounting the electronic device and having a bow-shaped securing element, by means of which the electronic device can be secured in the mounting, wherein the base part has a guiding device having respective lateral guiding elements, by means of which the electronic device can be inserted into the holding device.
Figure 1B:
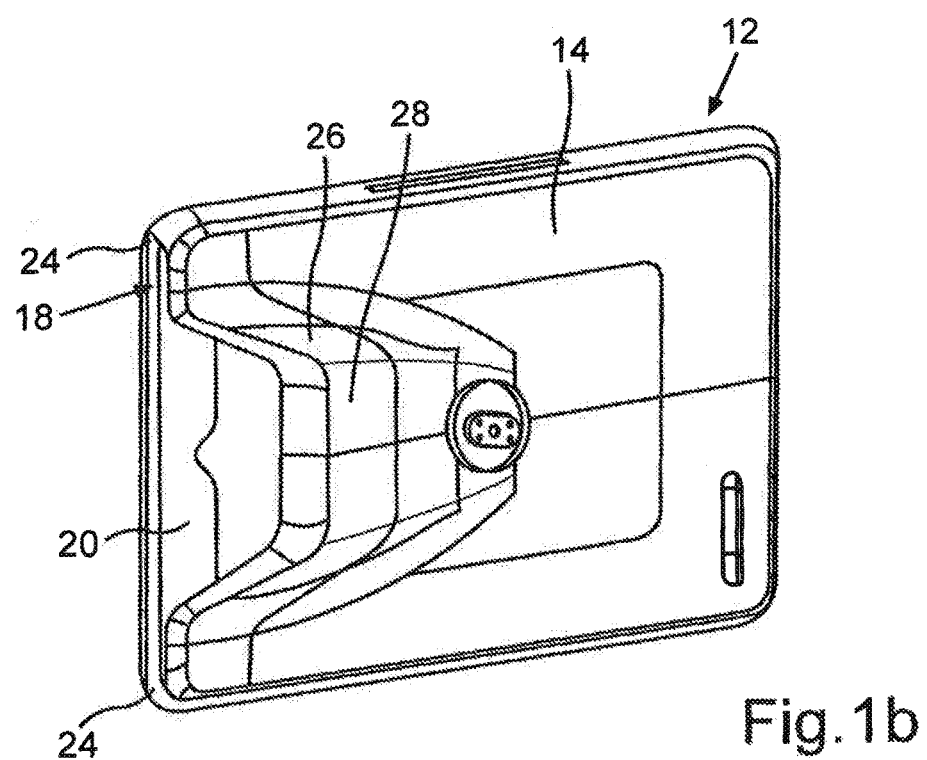
Figure 2A:
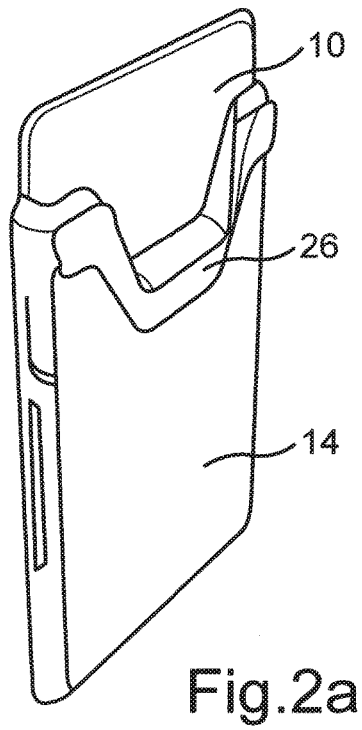
FIGS. 2a, 2b are a perspective view obliquely from above and a further perspective view obliquely from behind of the holding device according to FIGS. 1a and 1b, wherein a corresponding tablet computer is inserted into the base part respectively and secured in the inserted position by means of the securing element.
Figure 2B:
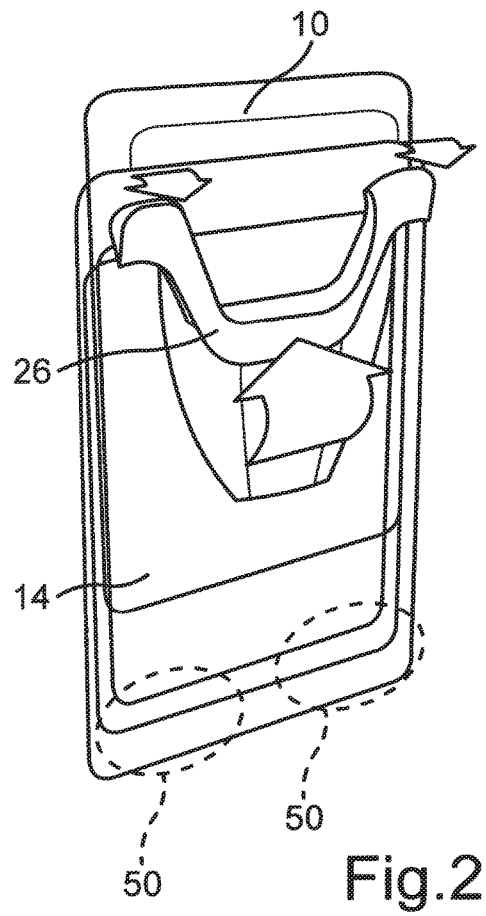

In FIGS. 1a and 1b, a holding device for a portable electronic device 10, which is subsequently recognizable in FIGS. 2a and 2b, is depicted in a top view and perspective rear view respectively. In the present case, the electronic device 10 is a so-called tablet computer. However, it would also be conceivable to provide the holding device for a mobile telephone or another electronic device. In the present case, the holding device is arranged in an interior of a motor vehicle, in particular for respective seats of a rear seat system. The holding device can thereby be arranged rearwards of a respective front seat or on another panelling part.

As is recognizable in particular from FIGS. 1a and 1b, the holding device firstly comprises a base part 12 which comprises a rear panel 14 and a frame 16 surrounding this.

As is now recognizable from an overall view of FIGS. 2a and 2b in a respective perspective view, the electronic device 10 can be inserted into the base part 12. For this purpose, the base part 12 has an insertion opening 18 which is delimited on one side by the rear panel 14 and on the other side by a frame element 20 of the frame 16.

In order to enable a particularly favorable insertion or introduction and fixing of the electronic device 10 within the base part 12, this comprises a guiding device 22 having respective lateral guiding elements 24 which extend along the longitudinal sides of the base part 12 over at least approximately the entire length. The distance and the respective contour of the guiding elements 24 is therefore adapted to the shape of the electronic device 10 such that this is preferably able to be inserted with slight play, but still easily guided into the cassette-like mounting which is formed by the guiding elements 24. The lateral guiding elements 24 thereby encompass the electronic device 10 such that positive locking results, which fixes the electronic device 10 thereto in both the transverse direction and vertical direction. Both the rear panel 14 and the respective guiding elements 24 can thereby be provided with a suitable coating, a cover or similar on the side facing towards the electronic device 10 or on the corresponding surfaces.

Figure 3:
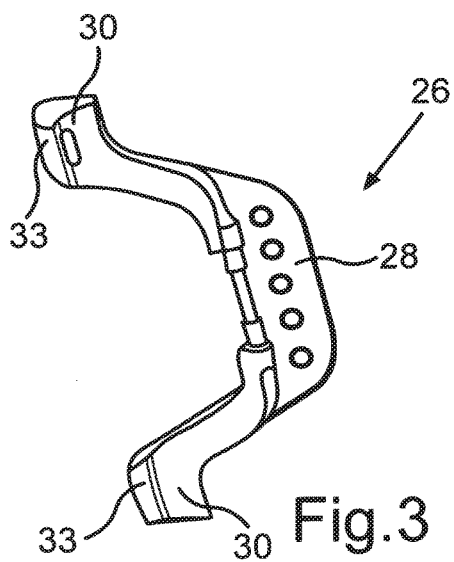
FIG. 3 is a perspective view of the separately depicted securing element.

FIG. 3 shows a securing element 26 in an individual perspective view, by means of which the electronic device 10, which is completely inserted according to FIGS. 2a and 2b, can be secured in the inserted position or location on the base part 12 and can therefore no longer be moved out of the shaft-like guiding device 22 without actuation of the securing element 26. The arrangement of the securing element 26 on the base part 12 is thereby recognizable from FIGS. 1b, 2a and 2b. The practical operation of the securing element 26 is thereby recognizable from FIG. 4 in particular. In this case, FIG. 4 shows the arrangement and operation of the securing element 26 on the base part 12 in three respective sectional views through the holding device.

Figure 4:
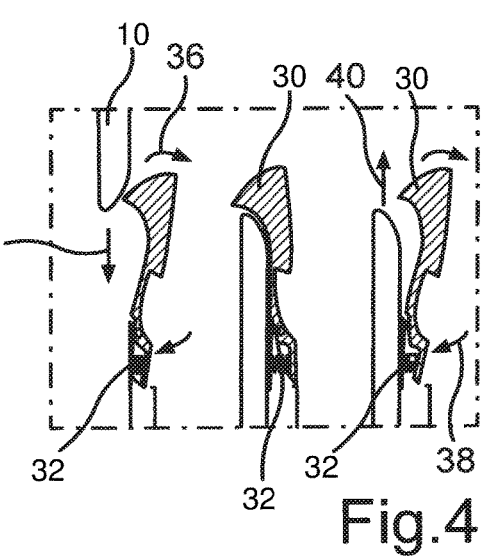
FIG. 4 is a series of three functional depictions of the securing element in each sectional view through the holding device, wherein it can be seen, in particular, how the securing element can be shifted between a release position and a securing position when inserting or pushing out the electronic device.

Firstly, it can be seen from FIG. 4 that the securing element is formed as a rocker having a handle 28 arranged on one side of a bearing axis and having two fixing elements 30 arranged on the other side of the bearing axis, which are respectively depicted in FIG. 4, in a sectional view. The fixing elements 30 are thereby provided on each of the two ends of the overall U-shaped securing element 26, as is recognizable from FIG. 3. The bearing axis thereby runs, as is recognizable in particular from an overall view of FIGS. 1a to 2b, in the transverse direction of the base part 12.

Furthermore, it is recognizable from FIGS. 3 and 4 that at least one spring element 32 is provided on the lower side of the handle 28, against the spring force of which the securing element 26 can be moved from a securing position shown in the middle depiction of FIG. 4 into a release position shown left and right in FIG. 4.

The securing element 26 can thereby be moved on one side into the release position, as can be seen in the left depiction of FIG. 4, if the electronic device 10 is inserted into the guiding device 22 of the base part 12 according to the arrow 34. In this case, the respective fixing element 30 of the securing element 26 has one respective slide ramp 33, by means of which the securing element 26 can be shifted according to the arrow 36 into the release position when the electronic device 10 is inserted into the holding device. On the other hand, the securing element 26 can be moved according to the arrow 38 into the release position by actuating or pressing the handle 28 such that, with the respective fixing element 30 being moved away, the electronic device can be released according to the arrow 40.

In particular, it is furthermore recognizable from FIG. 4 that the securing element 26 has a self-locking arrangement or mounting around the bearing axis. This means that, in the secure position, a force on the electronic device 10 in the extraction direction does not cause movement of the securing element 26. In fact, actuation of the handle 28 is firstly required here before the electronic device 10 can be removed.

It can furthermore be seen in particular from FIGS. 1a to 2b that an opening is provided in the rear panel 14, the opening having a substantially trapezoidal shape. This opening is surrounded by the U-shaped securing element 26 with spacing. The combination of the opening and the securing element 26 has the advantage that the handle 28 can be actuated and, with the same hand, the electronic device 10 can be removed in a simple manner from the guiding device 22 or mounting of the base part 12.

FIG. 5 shows the holding device in a front view or in two sectional views, wherein, in particular in the two sectional views, the base part 12 is only recognizable in a lower region which is facing away from the securing element 26. A spring support 44 is provided on this lower narrow side in the region of the frame 16, the spring support 44 comprising two bases 46 which are supported against an outer end face of the frame 16 via a respective spring element 48. Each of the two bases 46 is thereby arranged at a position 50 of the frame 16, which are indicated in FIG. 2b by dashed-lined ellipses in each case. A one-piece base 46 would, of course, also be conceivable here. The spring device 44 thereby has the effect that the electronic device 10 must be inserted into the holding device against its spring force. In this case, a preload of the respective spring elements 48 results. If the handle 28 of the securing element 26 is actuated after the end of use of the electronic device 10, and therefore the restraining lock is lifted according to the middle depiction of FIG. 4, then the electronic device 10 is pushed out or ejected from the guiding device 22 or mounting of the base part 12 by means of the spring force of the spring support 44. This results in an even better actuation of the handle 28 of the securing element 26 or removal of the electronic device 10 with just one hand.

It is thereby also recognizable from FIG. 5 in particular that the frame 16 also has a corresponding frame strip 52 on its lower narrow side, the frame strip 52 overlapping the electronic device 10 in the inserted position with one panel 54. A corresponding groove-like guide, which is formed, for example, in the style of the frame strip 52, therefore results not only laterally as a result of the respective guiding elements 24, but also on the lower side which faces away from the securing element 26. On the side facing away from the frame strip 52, the particularly favorable positioning of the electronic device 10 results by means of the frame element 20 which bridges the opening. The electronic device 10 is therefore mounted particularly favorably on all four of its outer sides by the base part 12.

FIGS. 6a and 6b finally show the base part 12 in the region of the insertion opening 18 in a front view and a perspective view. Once again, the positioning of the respective fixing elements 30 of the securing element 26 is thereby recognizable from FIG. 6a in particular. Once again, FIG. 6b clarifies the practical shape of the insertion opening 18 in particular, which is adapted to the cross section of the respective electronic device 10, in the present case, the tablet computer.

The invention claimed is:

1. A holding device for a portable electronic device in a motor vehicle, comprising:
   a base part for mounting the portable electronic device, wherein the base part includes a guiding device with lateral guiding elements and wherein the portable electronic device is insertable into the holding device via the guiding device; and
   a securing element disposed on the base part, wherein the portable electronic device is securable on the base part by the securing element;
   wherein the guiding device includes a spring support disposed on an opposite longitudinal end of the base part from the securing element, wherein the spring support includes a base, wherein a spring element is disposed within the base, and wherein an end of the portable electronic device is receivable in the base and is pushable out of the base by the spring element;
   wherein the securing element is a U-shaped bow which surrounds an opening in a rear panel of the base part.

2. The holding device according to claim 1, wherein the portable electronic device is fixed in an inserted position in the holding device by the lateral guiding elements.

3. The holding device according to claim 1, wherein the securing element is shiftable between a release position and a securing position, wherein in the securing position the securing element fixes the portable electronic device by a self-locking mounting.

4. The holding device according to claim 1, wherein the securing element is a rocker having a handle disposed on a first side of a bearing axis and having a fixing element disposed on a second side of the bearing axis, wherein the securing element has a slide ramp, and wherein the securing element is shiftable into a release position via the slide ramp when the portable electronic device is inserted into the holding device.

5. The holding device according to claim 1, wherein the base part has a circumferential frame having a frame element on a front that faces away from the rear panel and wherein the frame element bridges the opening in the rear panel.

* * * * *